United States Patent [19]
Emler

[11] 3,854,089
[45] Dec. 10, 1974

[54] LOW VOLTAGE MONITOR CIRCUIT
[75] Inventor: Michael G. Emler, Brighton, N.Y.
[73] Assignee: Stromberg-Carlson Corporation, Rochester, N.Y.
[22] Filed: Jan. 14, 1974
[21] Appl. No.: 432,847

[52] U.S. Cl............ 324/96, 315/133, 340/172, 340/253 C
[51] Int. Cl............................................ G01r 31/00
[58] Field of Search .. 324/96, 133; 340/172, 252 R, 340/253 C; 315/133, 134, 136

[56] References Cited
UNITED STATES PATENTS

| | | | |
|---|---|---|---|
| 3,136,920 | 6/1964 | Jensen | 315/133 X |
| 3,141,131 | 7/1964 | McCoy | 324/96 |
| 3,399,348 | 8/1968 | Praglin et al. | 324/96 |
| 3,416,069 | 12/1968 | Mandel | 324/96 X |

Primary Examiner—Stanley T. Krawczewicz
Attorney, Agent, or Firm—Hoffman Stone; William F. Porter, Jr.

[57] ABSTRACT

A simple and inexpensive circuit for monitoring one or more current sources and producing an active output signal whenever one of the monitored sources fails. Current from the monitored sources is applied to respective transistors to hold them in saturation so long as the sources operate normally. The transistors are connected in series with each other and with the input of an optical coupling device. An annunciator device is connected in series with a control transistor across a current source that is independent of the monitored sources, and the output of the optical coupling device holds the control transistor cut off so long as the monitored sources remain normally operative. When one of the monitored sources fails, or suffers a significant voltage drop, current applied at the input of the coupling device is reduced causing the control transistor to conduct, thereby to energize the annunciator.

3 Claims, 2 Drawing Figures

3,854,089

LOW VOLTAGE MONITOR CIRCUIT

BRIEF DESCRIPTION

This invention relates to a novel monitor circuit for producing an active output signal in response to the failure of a current source, or of one of a plurality of current sources.

In many cases it is desirable to provide an active signal to indicate the failure, or the significant deterioration, of a current source, and to have an annunciator energized from a source of energy separate from the current source being monitored. And in many of these cases it is also desirable to provide a high degree of isolation between the monitored source and the source from which the annunciator is energized. Also, certain systems include two or more current sources that should be monitored, but kept isolated from each other to a reasonable degree.

The circuit of the present invention is arranged to monitor one or more current sources, and to produce an active output signal in response to failure of any one, or in response to a significant deterioration that may forebode an imminent failure. The circuit includes an annunciator device which is energized from a current source independent of the monitored sources, so that failure of the monitored sources does not preclude operation of the annunciator. The circuit also provides a high degree of isolation between the monitored sources and the annunciator and its energizing source.

The circuit includes a sensing transistor for each of the sources to be monitored. The sources are connected in series with appropriate resistors and Zener diodes across the base to emitter electrodes of the respective sensing transistors. The sensing transistors are connected in series with each other and with the input of an optical coupler. So long as the monitored sources remain at their normal operating voltages the sensing transistors are held in saturation, and the output of the optical coupler is at a maximum value. The annunciator device, typically a light emitting diode, is connected in series with a control transistor across an independent power supply, and the output of the optical coupler is applied to the control transistor to hold it cut off during normal operation of the monitored sources. If one of the monitored sources fails, or if its voltage falls below its nominal value, which may indicate a probable early failure, the current through its sensing transistor is reduced causing a reduction of the current through the input of the optical coupler, a reduction of the output of the coupler, and a change of bias on the control transistor to permit current to flow through it and through the annunciator. Complete failure of one of the monitored sources causes the annunciator to come full on, while a modest drop in voltage causes the annunciator to be only partly energized. The operator or control engineer can judge the seriousness of the situation by the degree to which the annunciator comes on.

DETAILED DESCRIPTION

Figure 1:
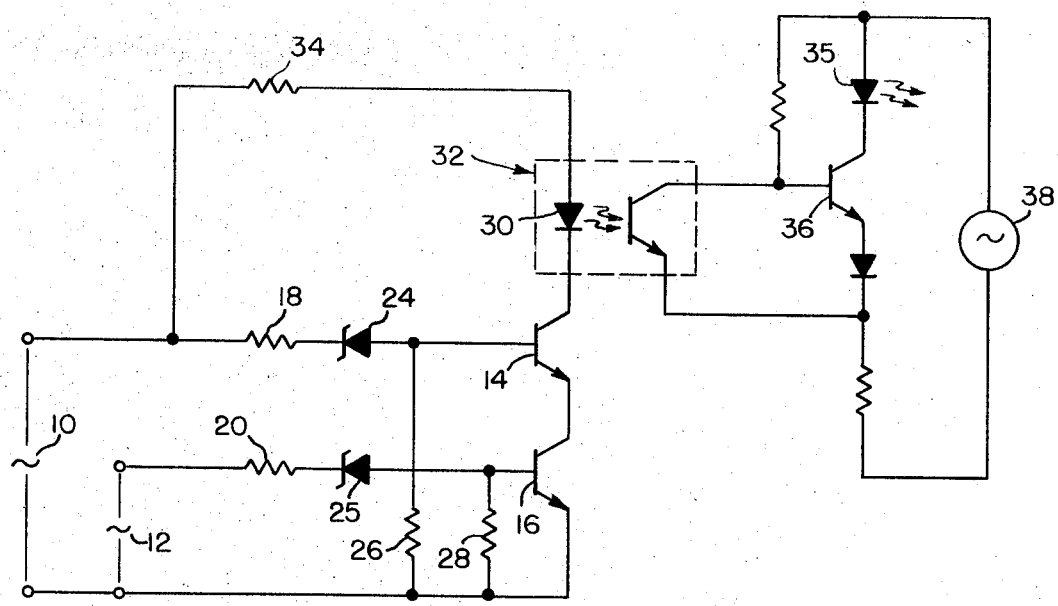
Figure 2:
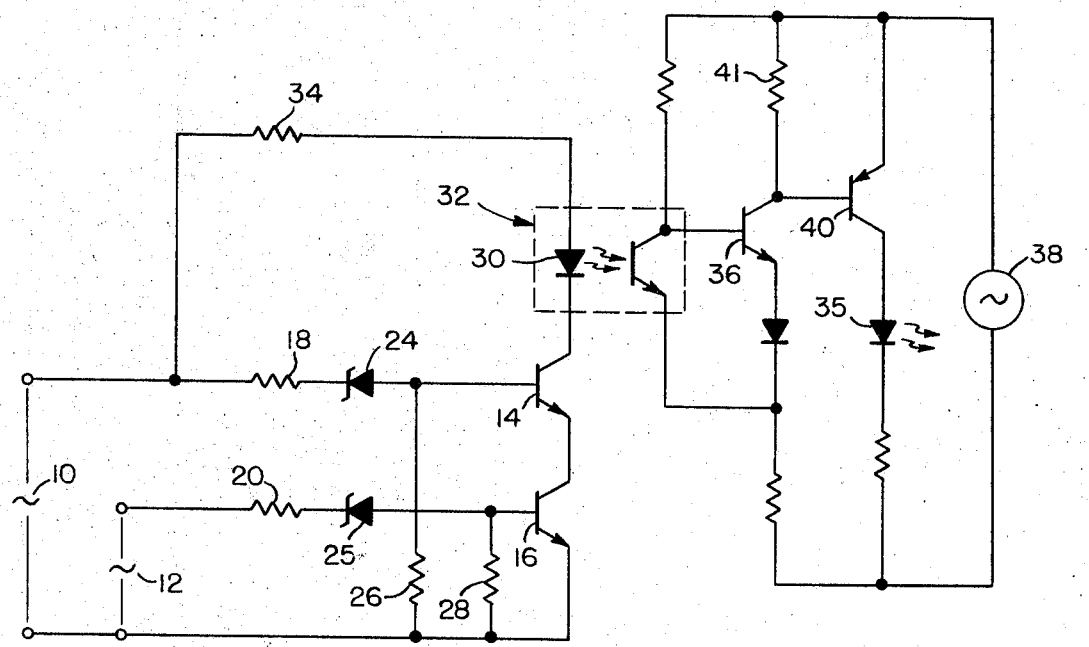

Representative embodiments of the invention will now be described in conjunction with the drawing, wherein:

FIG. 1 is a schematic circuit diagram of a monitor circuit according to a first embodiment of the invention; and FIG. 2 is a schematic circuit diagram of a monitor circuit according to a modified, and presently preferred form of the invention.

Referring first to FIG. 1, the circuit shown therein is arranged to monitor two current sources 10 and 12, respectively, and includes a separate sensing transistor 14 and 16, respectively, for each of the sources. The transistors are connected with their base to emitter circuits across the respective sources in series with limiting resistors 18 and 20, respectively, and Zener diodes 22 and 24, respectively, and in parallel with emitter resistors 26 and 28, respectively. The collector to emitter paths of the transistors 14 and 16 are connected in series with each other, with the input diode 30 of an optical coupling device 32, and a limiting resistor 34, across one of the two sources to be monitored, preferably the one having the higher voltage. So long as the monitored sources remain at their nominal voltages the transistors 14 and 16 are held saturated and the input current passed through the diode 30 of the optical coupler is at a maximum.

The annunciator device shown is a light emitting diode (LED) 35. It is connected in series with a control transistor 36 across a current source 38 that is independent of the monitored sources 10 and 12. The output of the optical coupler 32 is connected between the base and emitter of the control transistor 36 to hold it cut off so long as the monitored sources remain at their nominal voltages. The independent source 38 may be either direct or alternating current according to the designer's choice or the convenience of availability. As shown, the circuit is arranged for the source 38 to be direct current. Only minor modification, obvious to those skilled in the art, is required for satisfactory operation when the source 38 is alternating current.

The current flow into the bases of the sensing transistors 14 and 16 is proportional to the voltages of the respective sources 10 and 12, and the transistors, therefore, operate in their linear regions when the voltages of the monitored sources fall below their nominal values but remain above the critical "failure" values determined by the characteristics of the Zener diodes 24 and 25. Therefore, the optical coupler 32 and the control transistor 36 also operate in their linear regions, and the energization of the LED 35 varies in intensity directly in proportion as either one of the monitored sources suffers a decay in its voltage, until the voltage of one of the sources falls below its "failure" value, whereupon the LED becomes fully energized.

According to the preferred form of the invention, as shown in FIG. 2, the LED 35 of FIG. 1 is replaced by an amplifier network comprised of transistor 40 and resistor 41 which causes the energization of the LED 35. The preferred form of the invention provides a sharper characteristic in the operation of the annunciater 35. The amplifier 40 causes the annunciator 35 to be fully energized in response to a relatively small drop in the voltage across either one of the monitored sources 10 and 12, and the region of partial energization, in which the operator must judge the seriousness of the indication, is reduced according to the gain of the amplifier 40.

An important advantage of the circuit of the invention is the high degree of isolation between the annunciator 35 and its energizing source 38, on the one hand, and the monitored sources 10 and 12, on the other. The optical coupler 32 insures a typical isolation factor of $10^{11}$ ohms.

If desired, more than two sources may be monitored simultaneously simply by adding more sensing transistors. The main limitation in this regard is the voltage available to drive the sensing transistors and the input diode of the optical coupler.

What is claimed is:

1. A monitoring circuit for monitoring the voltage across a dc. current source comprising a sensing transistor, means for connecting the base and emitter electrodes of said transistor to respective terminals of the source to be monitored, an optical coupling device having an input diode connected in series with the collector and emitter of said transistor across the source to be monitored, a control transistor having its input connected to the output of said optical coupling device, an annunciator connected in series with the collector and emitter of said control transistor, and means for connecting said annunciator and said control transistor across a current source independent of the source to be monitored.

2. A circuit for monitoring a plurality of dc. current sources and for producing an active output signal in response to a predetermined drop in the voltage across any one of the sources comprising sensing transistors, one for each of the sources to be monitored, means for connecting the base and emitter of each of said transistors across a respective one of the sources, Zener diodes equal in number to the sources, means connecting said diodes respectively in series between the sources and the bases of said transistors, an optical coupling device having a diode at its input, means connecting said diode of said coupling device in series with the collectors and emitters of all of said transistors across one of the sources to be monitored, an annunciator device, a control transistor, the input of said control transistor being connected to the output of said optical coupling device, means connecting said annunciator device in series with said control transistor, and means for energizing the output of said optical coupling device, said annunciator, and said control transistor from a current source independent of the sources to be monitored.

3. A circuit according to claim 2 including an amplifier connected between the output of said optical coupling device and said control transistor to cause the annunciator to respond to small changes in the voltages of the sources being monitored.

* * * * *